United States Patent [19]
Gobert

[11] Patent Number: 5,905,233
[45] Date of Patent: *May 18, 1999

[54] NOISE SUPPRESSOR FOR DISPLACEMENT COMPRESSORS

[75] Inventor: Ulrich Gobert, Hisings Kärra, Sweden

[73] Assignee: AB Volvo, Gothenburg, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/607,303

[22] Filed: Feb. 26, 1996

[30] Foreign Application Priority Data

Feb. 24, 1995 [SE] Sweden .................................. 9500694

[51] Int. Cl.⁶ .............................. F02M 35/00; F01N 1/00
[52] U.S. Cl. .......................... 181/229; 181/247; 181/255
[58] Field of Search ..................................... 181/229, 262, 181/247, 248, 249, 250, 255, 282, 230

[56] References Cited

U.S. PATENT DOCUMENTS

| | | | |
|---|---|---|---|
| 3,608,666 | 9/1971 | Olsson | 181/255 |
| 3,811,531 | 5/1974 | Forssman | 181/258 |
| 4,790,864 | 12/1988 | Kostun | 181/229 |
| 4,936,413 | 6/1990 | Lee | 181/264 |
| 5,174,113 | 12/1992 | Deville | 181/262 |

*Primary Examiner*—Eddie C. Lee
*Attorney, Agent, or Firm*—Young & Thompson

[57] ABSTRACT

A noise suppressor for a displacement-type compressor, in particular in an engine installation with such a compressor connected in series with a turbocharger. The noise suppressor comprises a nozzle (31). The inlet of the nozzle is connected to the outlet of the compressor. The compressor's outlet merges into an expansion chamber (32) with a largest diameter ("d") greater than the largest inlet diameter ("e") of the nozzle. The chamber has an outlet formed by a second nozzle (33) identical to the first nozzle.

14 Claims, 2 Drawing Sheets

NOISE SUPPRESSOR FOR DISPLACEMENT COMPRESSORS

FIELD OF THE INVENTION

The present invention relates to a noise suppressor for a displacement-type compressor, comprising a nozzle arrangement having an inlet intended to be connected to the outlet of the compressor.

BACKGROUND OF THE INVENTION

It is a known fact that displacement-type compressors, for example, screw compressors, generate a low-frequency noise with large amplitudes which is particularly propagated in the outlet conduit of the compressor. It is known from SE-A-463 223 to suppress such noise from a screw compressor in, for example, a cooling plant by using a Laval nozzle connected to the outlet of the compressor.

SUMMARY OF THE INVENTION

Given the above mentioned known technology, the object of the present invention is generally to provide a noise suppressor which is particularly, though not exclusively, intended for supercharged internal combustion engines having a mechanically driven displacement-type compressor connected in series with a turbocharger, and which more effectively suppresses the noise which arises from the supercharger in such engines, in particular with the engine on the overrun, i.e. with no load and closed throttle, when the maximum boost pressure can greatly exceed the maximum boost pressure at full load.

This is achieved according to the invention by the provision of a noise suppressor of the type mentioned above in which the nozzle at its outlet side merges into a conical expansion chamber, the largest diameter of which is greater than the largest diameter of the nozzle at the inlet side.

Experiments conducted on diesel engines with series-connected compressors of the above mentioned type have revealed that by letting the compressed air expand after the nozzle in a conical chamber, a considerable improvement of the noise suppression can be attained compared to a nozzle noise suppressor without an expansion volume.

Generally, the larger the expansion ratio is, the better the noise suppression becomes. The limit is, however, set by factors such as the maximum allowed pressure drop, available space, etc., and in a preferred embodiment of the invention which has been shown to be optimal in terms of the noise suppression in relation to the pressure drop, the nozzle and the chamber have a cone angle of 10°–15° and the chamber's largest diameter is about 1.3–1.5 times the largest diameter of the nozzle at the inlet side. Furthermore, the chamber has an outlet which is formed by a second nozzle which has the same cone angle and the same minimum diameter as the first nozzle which forms the inlet to the chamber.

BRIEF DESCRIPTION OF THE DRAWINGS

The invention will be described in greater detail with reference to the embodiments shown in the attached drawings, in which.

DESCRIPTION OF THE PREFERRED EMBODIMENTS

Figure 1:
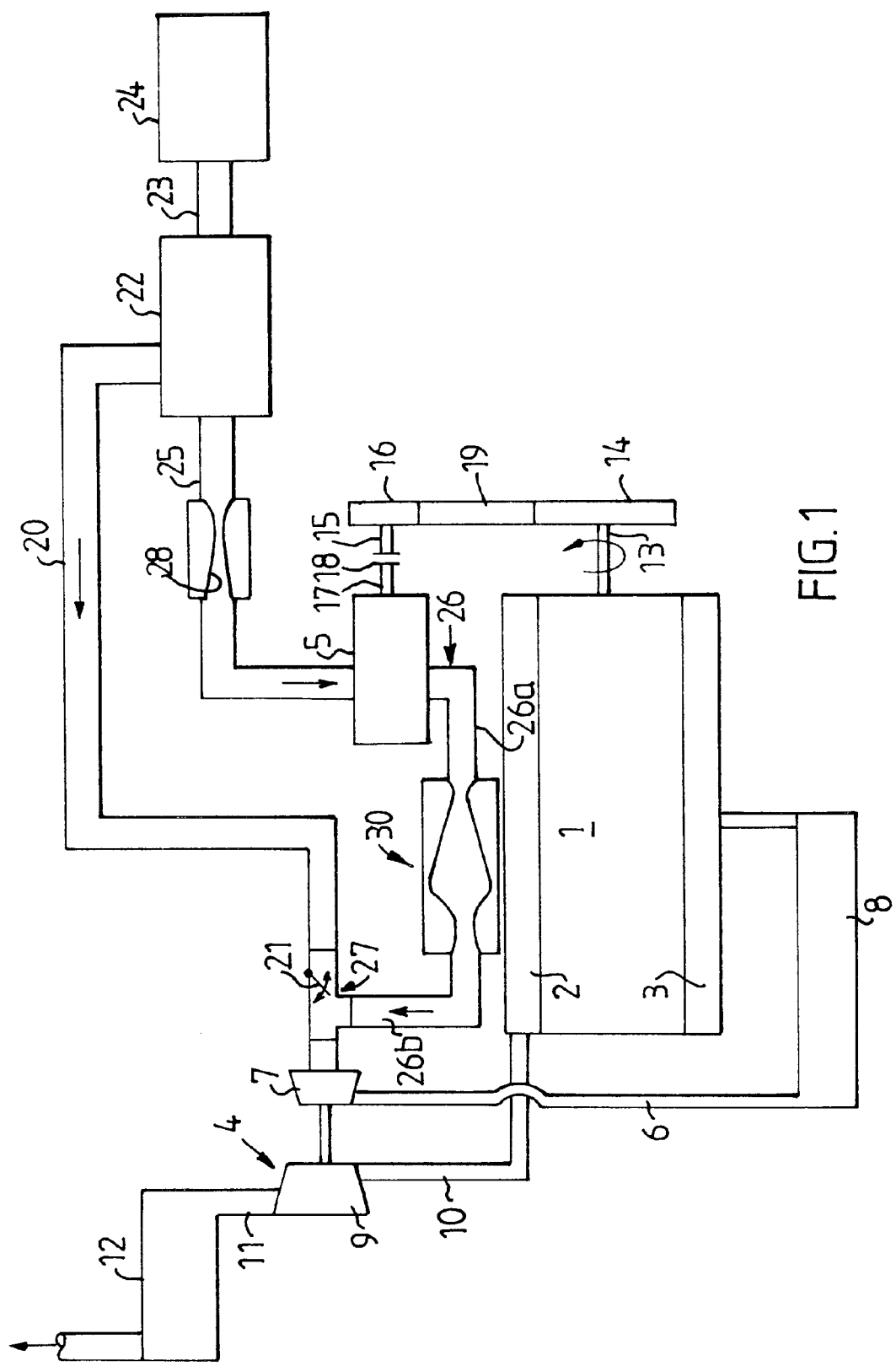
FIG. 1 shows a schematic view of an engine installation in which a compressor's noise suppressor according to the invention is included, and FIG. 2 a longitudinal cross section through an embodiment of a compressor noise suppressor according to the invention.

In FIG. 1, reference numeral 1 denotes an internal combustion engine, for example a diesel engine, with an exhaust manifold 2 and an inlet manifold 3. A turbocharger generally denoted by reference numeral 4 and a mechanically driven supercharger 5 of the displacement type feed air through a conduit 6 from the compressor side 7 of the turbocharger 4 and via an air intercooler 8 to the inlet manifold 3 of the motor. The turbine portion 9 of the turbocharger 4 is connected on the inlet side via a conduit 10 to the exhaust manifold 2 and on the outlet side via a conduit 11 to an exhaust system 12. The mechanical supercharger 5 is driven by the engine's crankshaft 13 via a transmission which, in the shown embodiment, is a belt drive comprising a pulley 14 arranged for co-rotation with the crankshaft 13, a pulley 16 arranged for co-rotation with a shaft 15, a clutch mechanism 18 arranged between the shaft 15 and an input shaft 17 to the supercharger 5 and a drive belt 19 running between the pulleys 14, 16.

The compressor portion 7 of the turbocharger 4 is connected on its suction side to a conduit 20 containing a non-return valve 21 opening on the suction side. The conduit 20 runs from an expansion chamber 22 into which a suction conduit 23 leads from the air filter 24 of the engine. A further conduit 25 leads from the expansion chamber 22 and is connected to the inlet of the mechanical supercharger 5. A conduit 26 from the outlet of the supercharger 5 leads to a junction 27 in the conduit 20 downstream of the non-return valve.

The conduit 25 on the inlet side to the supercharger 5 contains a nozzle 28 through which air from the expansion chamber 22 flows to the inlet of the supercharger 5. A nozzle arrangement generally denoted by reference numeral 30 is included in the conduit 25 on the outlet side of the supercharger. The nozzle arrangement is described in greater detail with reference to the preferred embodiment shown in FIG. 2.

The right-hand end of the nozzle arrangement 30 in the drawing is connected to the conduit 26a from the outlet of the mechanical supercharger, whilst the left-hand end is connected to the conduit 26b which leads to the junction 27 in the conduit 20. The nozzle arrangement 30, which consists of a funnel 30a and a pipe 30b made from metal or plastic and which are welded together via a weld seam 30c, can in principle be divided into three different portions with continuous transition into each other, namely a first nozzle 31 which extends from the right-hand end of the arrangement in the drawing and up to the parting line "a", a conical expansion chamber 32 having the same cone angle $\alpha$ as the nozzle 31 and which extends from the parting line "a" to the parting line "b", and a second nozzle 33 which is identical to the first nozzle 31 and terminates at the left-hand end of the nozzle arrangement 30. In general, the air velocity should be as great as possible at the minimum cross-section of the nozzles 31, 33 at the same time that the expansion ratio should be as great as possible in the expansion chamber. Limits are, however, imposed by the maximum allowed pressure drop, available space, the capacity of the belt drive 14, 16, 19, etc. Experiments carried out with nozzles 31, 33 and a chamber 32 with a cone angle of about 12° and where the chamber gave an expansion ratio of 1:2, i.e. the largest diameter "d" of the chamber was about 1.4 times the inner diameter "e" of the conduit 26a before the inlet have provided optimal results in terms of noise suppression and performance for a given engine which, in the case in question, was a six-cylinder diesel engine with six litres swept volume. Depending on the type of engine and the noise frequency range which is prioritised for the noise suppression, the above values will vary. In terms of the cone angle $\alpha$, this can lie between about 10° and 15° and for the expansion ratio 1: about 1.5–2.3, i.e. the largest diameter of the chamber can be 1.2–1.5 times the diameter of the conduit 26a.

The embodiment described in connection with FIG. 1 with an expansion chamber 22, a nozzle 28 on the inlet side of the mechanical supercharger and the arrangement 30 with a double nozzle with intermediate expansion chamber on the outlet side provides maximum noise suppression of noise from the mechanical supercharger 5. Depending on the noise suppression demands and available space in the engine compartment, etc., the nozzle 28 on the inlet side and the nozzle 33 after the conical expansion chamber 32 may be omitted since the expansion chamber 22 and the first nozzle 31 on the outlet side together with the conical expansion chamber have been shown to provide the greatest contribution to the noise suppression. So as to permit simple installation using a clip in the engine compartment, the external side of the chamber has a cylindrical region 35.

When the suction requirements of the turbocharger 4 exceed the maximum air capacity of the mechanical supercharger, the non-return valve 21 is opened so that the turbocharger 4 can draw air directly from the expansion chamber. In this position, the mechanical supercharger 5 can be disconnected via the clutch 18.

Figure 2:
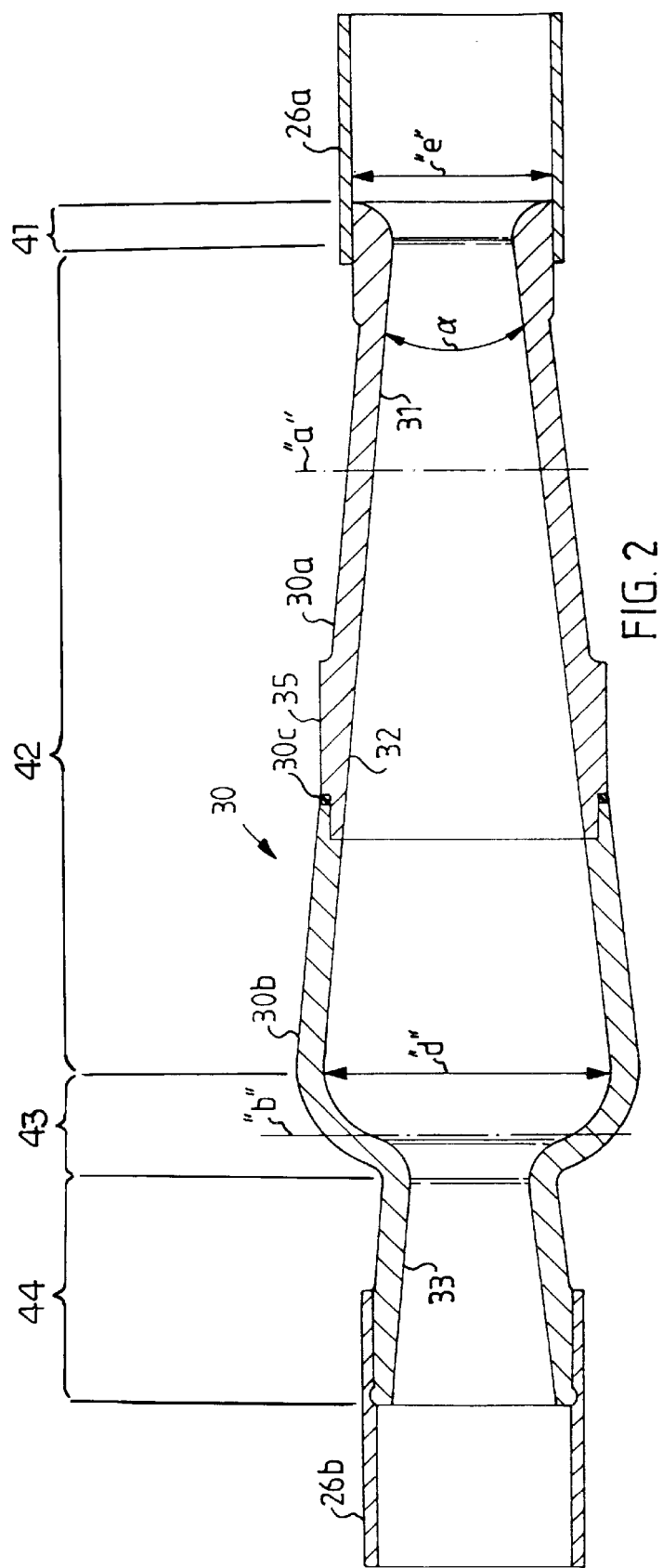

Alternatively stated, the inventive noise suppressor shown in FIG. 2 can include a funnel 30a and a pipe 30b.

The funnel 30a includes an inlet, which engages the conduit 26a from the supercharger's outlet, and an outlet distal from the inlet in the direction of fluid flow therethrough. A cone angle a of the funnel 30a is measured at an outlet end of the funnel. All references to cross-section refer to interior cross-section. A minimum cross-section of the funnel is located at the boundary separating tube portions 41 and 42 between the inlet end and the outlet end of the funnel 30a.

The pipe 30b includes an inlet portion mated with the outlet of the funnel. The inlet portion has a continuously increasing cross-section in the direction of fluid flow. The pipe 30b includes an intermediate portion 43 abutting the inlet portion thereof. The intermediate portion has a continuously-decreasing cross-section in the direction of fluid flow. The pipe 30b also includes an outlet portion 44 abutting the intermediate portion. The outlet portion has a continuously increasing cross-section in the direction of fluid flow. A cone angle of the pipe 30b is measured at the outer end of the outlet portion thereof. A minimum cross-section of the pipe 30b is located at the junction of the intermediate portion and the outlet portion. The cone angle of the funnel is equal to the cone angle of the pipe 30b.

The noise suppressor 30a, 30b can alternatively be defined as four tube portions, considered from right to left as viewed in FIG. 2.

The first tube portion 41 has a continuously decreasing cross-section in the direction of fluid flow therethrough.

A second tube portion 42, abutting the first tube portion 41, includes a continuously increasing cross-section in the direction of fluid flow. A first local minimum cross-section is located at the junction of the first and second tube portions 41 and 42. The second tube portion 42 has an interior cone angle.

The third tube portion 43, abutting the second tube portion 42 and corresponding to the intermediate portion of the pipe 30b discussed above, includes a continuously decreasing cross-section in the direction of fluid flow.

The fourth tube portion 44, abutting the third tube portion 43 and corresponding to the outlet portion of the pipe 30b discussed above, includes a continuously increasing cross-section in the direction of fluid flow. A second local minimum cross-section is located at the junction of the third and fourth tube portions 43 and 44. The fourth tube portion 44 has an interior cone angle equal to the interior cone angle of the second tube portion.

What is claimed is:

1. A noise suppressor for a displacement-type compressor, comprising:
    a funnel having an outlet and an inlet, an interior cone angle of said funnel being measured at an outlet end of said funnel, a minimum cross-section of said funnel being located between an inlet end of said funnel and said outlet end of said funnel; and
    a pipe including an inlet portion mated with said outlet of said funnel and having a continuously increasing cross-section in a direction of fluid flow, an intermediate portion abutting said inlet portion having a continuously decreasing cross-section in said direction of fluid flow, and an outlet portion abutting said intermediate portion having a continuously increasing cross-section in said direction of fluid flow, an interior cone angle of said pipe being measured at said outlet portion, a minimum cross-section of said pipe being located at a junction of said intermediate portion and said outlet portion, an interior of said funnel and an interior of said pipe together defining a conical expansion chamber,
    wherein said cone angle of said funnel is equal to said cone angle of said pipe.

2. The noise suppressor according to claim 1, wherein said minimum cross-section of said funnel is equal to said minimum cross-section of said pipe.

3. The noise suppressor according to claim 1, wherein said cone angle of said funnel and said cone angle of said pipe are each about 10° to 15°, a maximum width of said conical expansion chamber being 1.3 to 1.5 times a maximum width of said funnel at an inlet end thereof.

4. The noise suppressor according to claim 3, wherein said cone angle of said funnel and said cone angle of said pipe are each 12°, said maximum width of said conical expansion chamber being 1.4 times said maximum width of said funnel.

5. The noise suppressor according to claim 1, wherein said funnel and said pipe together comprise a container, an exterior region of which has a constant width.

6. The noise suppressor according to claim 5, wherein said funnel and said pipe are mated at a weld seam located at said exterior region of constant width.

7. The noise suppressor according to claim 6, wherein said funnel and said pipe include a plastic material.

8. The noise suppressor according to claim 1, wherein said funnel includes a first portion of continuously decreasing cross-section in said direction of fluid flow and a second portion having a continuously increasing cross-section in said direction of fluid flow.

9. A noise suppressor for a displacement-type compressor, comprising:
    a first tube portion including a continuously decreasing cross-section in a direction of fluid flow there-through;
    a second tube portion abutting said first portion and including a continuously increasing cross-section in said direction of fluid flow, a first local minimum cross-section located at a junction of said first and second tube portions, said second tube portion having an interior cone angle;
    a third tube portion abutting said second tube portion and including a continuously decreasing cross-section in said direction of fluid flow; and a fourth tube portion abutting said third tube portion and including a continuously increasing cross-section in said direction of fluid flow, a second local minimum cross-section located at a junction of said third and fourth tube portions, said fourth tube portion having an interior cone angle equal to said cone angle of said second tube portion, an interior of said second portion and an interior of said third portion comprising a conical expansion chamber.

10. The noise suppressor according to claim 9, wherein said first local minimum cross-section is equal to said second local minimum cross-section.

11. The noise suppressor according to claim 9, wherein said cone angle of said second tube portion and said. cone angle of said fourth tube portion are each about 10° to 15°, a maximum width of said conical expansion chamber being 1.3 to 1.5 times a maximum width of said first tube portion at an inlet end thereof.

12. The noise suppressor according to claim 11, wherein said cone angle of said second tube portion and said cone angle of said fourth tube portion are each 12°, said maximum width of said conical expansion chamber being 1.4 times said maximum width of said first tube portion.

13. The noise suppressor according to claim 9, wherein said tube portions together comprise a container, an exterior region of which has a constant width.

14. The noise suppressor according to claim 13, wherein said container includes a plastic material.

* * * * *